US011878563B2

(12) United States Patent
Müller et al.

(10) Patent No.: US 11,878,563 B2
(45) Date of Patent: Jan. 23, 2024

(54) MULTI-POINT LINK FOR AN UNDERCARRIAGE OF A VEHICLE

(71) Applicant: ZF FRIEDRICHSHAFEN AG, Friedrichshafen (DE)

(72) Inventors: Ingolf Müller, Freimersheim (DE); Jens Heimann, Stetten (DE); Andre Stieglitz, Osnabrück (DE); Carsten Sohl, Fredericia (DK); Valentin Hörtdörfer, Hirschberg an der Bergstraße (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 140 days.

(21) Appl. No.: 17/609,039

(22) PCT Filed: Apr. 8, 2020

(86) PCT No.: PCT/EP2020/060025
§ 371 (c)(1),
(2) Date: Nov. 5, 2021

(87) PCT Pub. No.: WO2020/224907
PCT Pub. Date: Nov. 12, 2020

(65) Prior Publication Data
US 2022/0212510 A1    Jul. 7, 2022

(30) Foreign Application Priority Data
May 6, 2019    (DE) ............... 10 2019 206 436.1

(51) Int. Cl.
*B60G 7/00*    (2006.01)

(52) U.S. Cl.
CPC ........ *B60G 7/001* (2013.01); *B60G 2206/012* (2013.01); *B60G 2206/12* (2013.01);
(Continued)

(58) Field of Classification Search
CPC ............. B60G 7/001; B60G 2206/012; B60G 2206/12; B60G 2206/121;
(Continued)

(56) References Cited

U.S. PATENT DOCUMENTS 369,883  A  *  9/1887  Richards ................. F16C 7/023
                                                   74/594
2,274,417  A  *  2/1942  Katcher .............. F16C 11/0604
                                                   403/226
(Continued)

FOREIGN PATENT DOCUMENTS

DE    102014215390    11/2015
DE    102015107005    11/2015
(Continued)

OTHER PUBLICATIONS

Search Report dated Jan. 27, 2022 issued in German Patent Application No. 10 2019 206 436.1.

*Primary Examiner* — Paul N Dickson
*Assistant Examiner* — Timothy Wilhelm
(74) *Attorney, Agent, or Firm* — Cozen O'Connor

(57) ABSTRACT

A multipoint link for an undercarriage of a vehicle, having a core element formed from a foamed material and at least one roving of bundled continuous filaments wound around the core element, the at least one roving winding around the core element in at least one layer forming an outer layer of the multipoint link. The recesses serving to guide the at least one roving to be laid by winding are incorporated in the surface of the core element.

14 Claims, 8 Drawing Sheets

(52) U.S. Cl.
CPC .................. *B60G 2206/121* (2013.01); *B60G 2206/7105* (2013.01); *B60G 2206/85* (2013.01)

(58) Field of Classification Search
CPC ........ B60G 2206/7105; B60G 2206/85; B60G 2206/7101
See application file for complete search history.

(56) References Cited

U.S. PATENT DOCUMENTS

| | | | | |
|---|---|---|---|---|
| 2,723,705 A * | 11/1955 | Collins | .................. | B29C 53/68 138/140 |
| 3,015,238 A * | 1/1962 | Williams | ............. | B60G 17/005 301/137 |
| 3,111,569 A * | 11/1963 | Rubenstein | ............. | B29C 70/86 264/45.2 |
| 3,370,483 A * | 2/1968 | Ditlinger | ............... | B64C 27/327 416/135 |
| 3,408,124 A * | 10/1968 | Melton | ................. | F16C 11/083 403/288 |
| 3,411,379 A * | 11/1968 | Deyerling | ............. | B29C 53/564 74/579 R |
| 3,475,988 A * | 11/1969 | Ditlinger | ................. | F16C 7/026 416/135 |
| 3,722,931 A * | 3/1973 | Uchida | ............... | F16C 11/0619 280/93.508 |
| 4,183,261 A * | 1/1980 | Eiselbrecher | ........... | B29C 70/56 24/265 EE |
| 4,261,390 A | 4/1981 | Belofsky | | |
| 4,300,410 A * | 11/1981 | Raghupathi | ........... | B29C 53/564 428/377 |
| 4,353,267 A * | 10/1982 | Robert | .................... | B29C 70/86 74/579 R |
| 4,411,114 A * | 10/1983 | Wurtinger | ............... | F16C 7/026 403/267 |
| 4,414,860 A * | 11/1983 | Brunsch | ................. | F16C 7/026 74/579 E |
| 4,552,035 A * | 11/1985 | Skipper | ................. | B64C 27/327 59/84 |
| 4,603,084 A * | 7/1986 | Drachenberg | .......... | F16C 7/026 428/377 |
| 4,650,620 A * | 3/1987 | Owen | ................ | B29C 53/821 264/257 |
| 4,671,336 A * | 6/1987 | Anahara | ................. | F16C 7/026 74/579 E |
| 4,704,918 A * | 11/1987 | Orkin | ...................... | F16C 7/026 464/181 |
| 4,750,960 A * | 6/1988 | Bubeck | ................ | B65H 71/007 156/169 |
| 4,772,044 A * | 9/1988 | Booher | ................ | B29C 70/52 267/47 |
| 4,811,626 A * | 3/1989 | Bezin | ....................... | B62M 3/00 74/594.1 |
| 4,841,801 A * | 6/1989 | Tice | ........................ | F16C 7/026 123/197.3 |
| 4,857,124 A * | 8/1989 | Shobert | .................... | B29C 53/68 156/149 |
| 4,873,889 A * | 10/1989 | Ditlinger | ................ | B29C 53/56 464/69 |
| 4,883,289 A * | 11/1989 | Sardou | ................ | F16F 1/366 267/273 |
| 4,887,486 A * | 12/1989 | Wood, Jr. | ........... | F16C 11/0619 403/141 |
| 4,992,313 A * | 2/1991 | Shobert | ................... | B29C 63/24 428/36.1 |
| 5,267,751 A * | 12/1993 | Hiromoto | ............... | F16F 1/368 280/124.134 |
| 5,374,780 A * | 12/1994 | Pazdirek | .................. | B29C 70/86 174/209 |
| 5,397,272 A * | 3/1995 | Smiley | ................... | F16C 3/026 464/181 |
| 5,406,033 A * | 4/1995 | Pazdirek | ............... | H01B 17/325 174/209 |
| 5,435,869 A * | 7/1995 | Christensen | .......... | B29C 70/347 156/169 |
| 5,556,081 A * | 9/1996 | Miura | ..................... | B29C 70/86 267/47 |
| 5,690,034 A * | 11/1997 | Schahl | ................... | B29C 70/86 105/199.1 |
| 5,720,833 A * | 2/1998 | Grube | ................... | B60G 7/001 264/68 |
| 5,788,263 A * | 8/1998 | VanDenberg | ........ | B60G 21/051 280/124.157 |
| 5,992,867 A * | 11/1999 | Kato | ..................... | B60G 7/001 280/124.134 |
| 6,116,113 A * | 9/2000 | Pazdirek | ............... | B29C 70/207 57/230 |
| 6,129,367 A * | 10/2000 | Bublies | ................ | B60G 21/051 280/124.107 |
| 6,152,433 A * | 11/2000 | Hettich | ................... | B60G 7/001 180/352 |
| 6,202,505 B1 * | 3/2001 | Auberon | ................. | F16C 7/026 74/579 R |
| 6,324,940 B1 * | 12/2001 | Pazdirek | ................. | F16C 7/026 57/230 |
| 6,371,682 B1 * | 4/2002 | Maughan | ................ | B62D 7/16 280/93.508 |
| 6,564,675 B1 * | 5/2003 | Jiang | ..................... | B62K 19/16 74/594.1 |
| 6,749,360 B2 * | 6/2004 | Abels | .................... | B60G 7/001 403/294 |
| 6,905,129 B2 * | 6/2005 | Runte | .................... | B60G 7/001 280/124.134 |
| 6,958,105 B2 * | 10/2005 | Herrmann | ............. | B29C 70/443 156/245 |
| 7,013,753 B2 * | 3/2006 | Valle | ..................... | B62K 19/16 74/594.1 |
| 7,028,998 B2 * | 4/2006 | Daily | .................... | B60G 21/055 267/273 |
| 7,086,655 B2 * | 8/2006 | Chan | ...................... | B60G 7/001 280/124.132 |
| 7,205,251 B2 * | 4/2007 | Wellman | ................ | B29C 70/347 442/373 |
| 7,451,795 B2 * | 11/2008 | Weg | ..................... | B29C 53/8091 156/425 |
| 7,753,384 B2 * | 7/2010 | Kunze | ...................... | B60G 9/00 280/124.143 |
| 7,918,439 B2 * | 4/2011 | Morales Arnaez | .... | B60G 7/001 267/141.3 |
| 7,921,629 B2 * | 4/2011 | Scholten | ................ | D04H 3/045 57/13 |
| 7,959,236 B2 * | 6/2011 | Mercat | .................... | B60B 21/04 152/381.6 |
| 7,980,575 B2 * | 7/2011 | Quaing | ................... | B60G 9/00 180/358 |
| 8,024,993 B2 * | 9/2011 | Dal | ........................ | B29C 70/16 74/594.1 |
| 8,394,222 B2 * | 3/2013 | Rettig | ................. | B29C 53/8016 156/169 |
| 8,617,336 B2 * | 12/2013 | Kawamura | ........... | B29C 53/564 156/173 |
| 8,714,571 B2 * | 5/2014 | Nataraj | .................. | B60G 7/005 280/124.13 |
| 8,777,162 B2 * | 7/2014 | Benthien | ................. | F16C 7/026 244/131 |
| 8,777,244 B2 * | 7/2014 | Seethaler | ................ | B60G 3/06 280/124.17 |
| 8,793,965 B2 * | 8/2014 | Kurath-Grollmann | ...................... | B29D 24/002 52/843 |
| 8,863,616 B2 * | 10/2014 | Ciavatta | .................... | B62M 3/00 74/594.1 |
| 9,090,289 B2 * | 7/2015 | Heise | ................... | B62D 29/001 |
| 9,121,458 B2 * | 9/2015 | Dilje | .................... | F16D 23/025 |
| 9,168,801 B2 * | 10/2015 | Dicke | .................... | B60G 7/001 |
| 9,259,878 B2 * | 2/2016 | Valembois | ............. | F16C 7/026 |
| 9,393,850 B2 * | 7/2016 | Kuroda | ................ | B60G 21/0551 |
| 9,404,249 B2 * | 8/2016 | Langone | ................ | E04B 1/30 |
| 9,555,683 B2 * | 1/2017 | Eismann | ................ | B60G 9/022 |

(56) References Cited

U.S. PATENT DOCUMENTS

| | | | | |
|---|---|---|---|---|
| 9,610,818 B2* | 4/2017 | Mark | ................... | F16F 1/3849 |
| 9,616,725 B2* | 4/2017 | Kuroda | .................. | B60G 7/005 |
| 9,751,564 B2* | 9/2017 | Muehlhausen | ...... | B62D 29/005 |
| 9,937,657 B2* | 4/2018 | Wakeman | .................. | B32B 5/28 |
| 10,105,916 B2* | 10/2018 | Dal Prà | .................... | B62M 3/00 |
| 10,162,107 B2* | 12/2018 | Paré | ......................... | G01J 3/10 |
| 10,189,326 B2* | 1/2019 | Steber | .................. | B29C 66/1284 |
| 10,220,666 B2* | 3/2019 | Kuroda | .................. | B60G 21/055 |
| 10,239,373 B2* | 3/2019 | Hugo | ..................... | B60G 7/001 |
| 10,350,951 B2* | 7/2019 | Meyer | .................. | B29C 70/443 |
| 10,471,790 B2* | 11/2019 | Meyer | .................... | B60G 7/001 |
| 10,487,869 B2* | 11/2019 | Beale | ..................... | F16C 7/026 |
| 10,493,703 B2* | 12/2019 | Yasui | ....................... | B64C 9/02 |
| 10,549,592 B2* | 2/2020 | Meyer | .............. | B29C 45/14336 |
| 10,562,349 B2* | 2/2020 | Nagel | .................. | B60G 11/465 |
| 10,850,329 B2* | 12/2020 | Tenhaeff | ............. | B60G 7/001 |
| 10,864,788 B2* | 12/2020 | Müller | ................... | B60G 7/001 |
| 10,870,241 B2* | 12/2020 | Eichenhofer | ......... | B29C 70/521 |
| 10,919,359 B2* | 2/2021 | Rapp | ..................... | B60G 7/001 |
| 10,974,559 B2* | 4/2021 | Mainz | .................. | B29C 70/081 |
| 11,014,610 B2* | 5/2021 | Bierbaumer | ........... | B62D 65/02 |
| 11,104,195 B2* | 8/2021 | Stieglitz | ................ | B60G 7/001 |
| 11,173,763 B2* | 11/2021 | Stieglitz | .................. | F16C 7/026 |
| 11,241,928 B2* | 2/2022 | Kim | ....................... | B60G 7/001 |
| 11,298,997 B2* | 4/2022 | Stieglitz | ................ | B60G 7/001 |
| 11,485,185 B2* | 11/2022 | Stieglitz | ................ | B60G 7/001 |
| 11,519,460 B2* | 12/2022 | Falossi | .................... | F16C 33/64 |
| 11,541,710 B2* | 1/2023 | Hoschouer | ............ | B60G 7/005 |
| 2003/0160414 A1* | 8/2003 | Pincerato | ............... | B60G 7/001 |
| | | | | 280/93.51 |
| 2004/0045762 A1* | 3/2004 | Budde | ................... | B62D 29/004 |
| | | | | 180/312 |
| 2004/0051268 A1* | 3/2004 | Chan | ...................... | B60G 9/003 |
| | | | | 280/124.1 |
| 2004/0135337 A1* | 7/2004 | Alesso | .................. | B60G 7/001 |
| | | | | 280/124.134 |
| 2005/0044984 A1* | 3/2005 | Jones | ......................... | E04C 3/29 |
| | | | | 74/579 R |
| 2005/0276945 A1* | 12/2005 | Muggli | ............... | B29C 37/0082 |
| | | | | 428/119 |
| 2005/0281610 A1* | 12/2005 | MacLean | ............ | F16C 11/0633 |
| | | | | 403/56 |
| 2007/0186719 A1* | 8/2007 | Ciavatta | .................. | B29C 70/86 |
| | | | | 74/594.1 |
| 2007/0199403 A1* | 8/2007 | Ciavatta | .................... | F16C 3/22 |
| | | | | 74/594.1 |
| 2007/0264470 A1* | 11/2007 | Wellman | ............. | B29C 37/0085 |
| | | | | 428/105 |
| 2008/0272572 A1 | 11/2008 | Tsai | | |
| 2009/0014977 A1* | 1/2009 | Molenaar | ............... | B60G 7/001 |
| | | | | 280/124.134 |
| 2010/0084834 A1* | 4/2010 | Ersoy | .................... | B60G 7/001 |
| | | | | 280/124.1 |
| 2010/0209185 A1* | 8/2010 | Kirth | ........................ | B29C 70/86 |
| | | | | 403/292 |
| 2012/0211931 A1* | 8/2012 | Fane De Salis | ........ | F16F 1/368 |
| | | | | 267/158 |
| 2012/0305173 A1* | 12/2012 | Masson | ................. | B29C 70/545 |
| | | | | 156/185 |
| 2012/0315414 A1* | 12/2012 | Wesch | ................. | B62D 29/005 |
| | | | | 428/34.1 |
| 2015/0030806 A1* | 1/2015 | Fink | ...................... | B32B 15/046 |
| | | | | 428/116 |
| 2015/0158361 A1* | 6/2015 | Eismann | ................ | B60G 9/022 |
| | | | | 280/124.116 |
| 2016/0355914 A1* | 12/2016 | Takemura | ................ | C22F 1/047 |
| 2017/0130764 A1* | 5/2017 | Yasui | ...................... | F16C 7/026 |
| 2017/0355239 A1* | 12/2017 | Souschek | ................ | B60G 3/02 |
| 2018/0126689 A1* | 5/2018 | Gaigler | ................. | B29C 53/607 |
| 2019/0133807 A1* | 5/2019 | Siewert | ................. | A61F 5/0127 |
| 2019/0160903 A1* | 5/2019 | Schramm | ................ | B29C 70/345 |
| 2020/0180376 A1* | 6/2020 | Stieglitz | ................ | B60G 7/001 |
| 2020/0223273 A1* | 7/2020 | Kwon | ................. | B29C 45/14754 |
| 2020/0307333 A1* | 10/2020 | Reddehase | .......... | F16C 11/0609 |
| 2021/0107243 A1* | 4/2021 | Eichenhofer | ............ | B29C 70/86 |
| 2021/0323135 A1* | 10/2021 | Lübkert | .............. | B29C 45/0005 |
| 2022/0212511 A1* | 7/2022 | Müller | ................... | B60G 7/001 |

FOREIGN PATENT DOCUMENTS

| | | |
|---|---|---|
| DE | 102014225435 A1 * | 6/2016 |
| DE | 102014226408 | 6/2016 |
| DE | 102016209041 | 11/2017 |
| DE | 102016223383 A1 * | 5/2018 |
| DE | 102017213564 | 2/2019 |

* cited by examiner

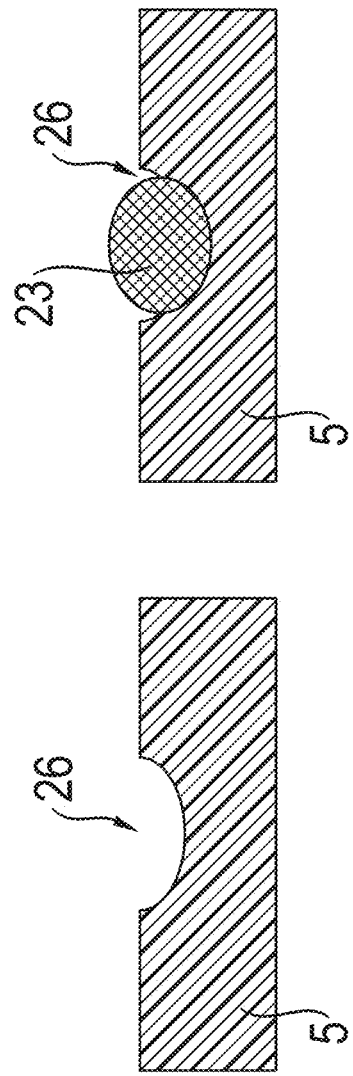
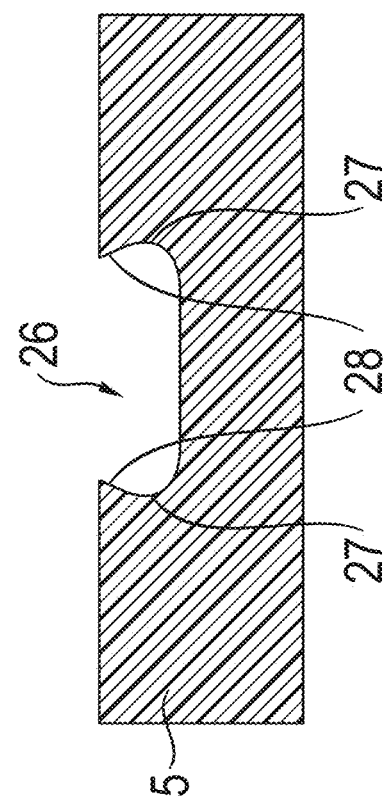

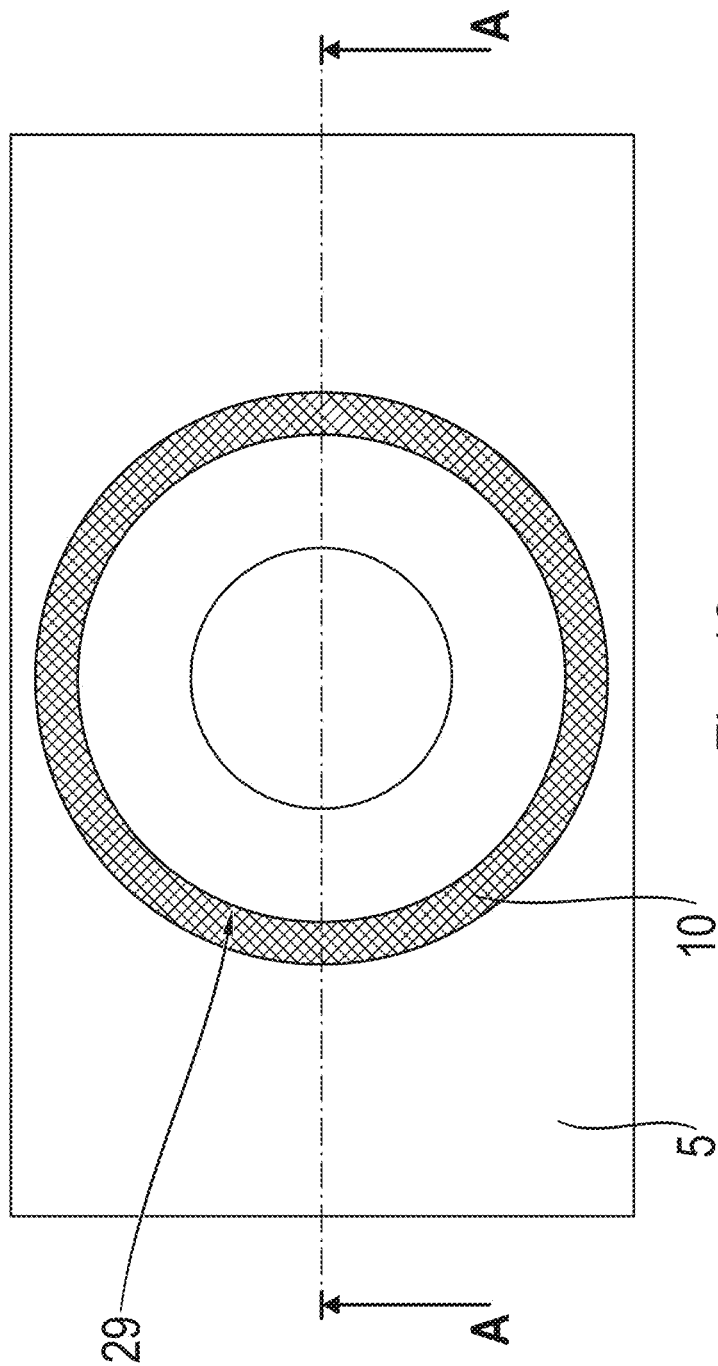
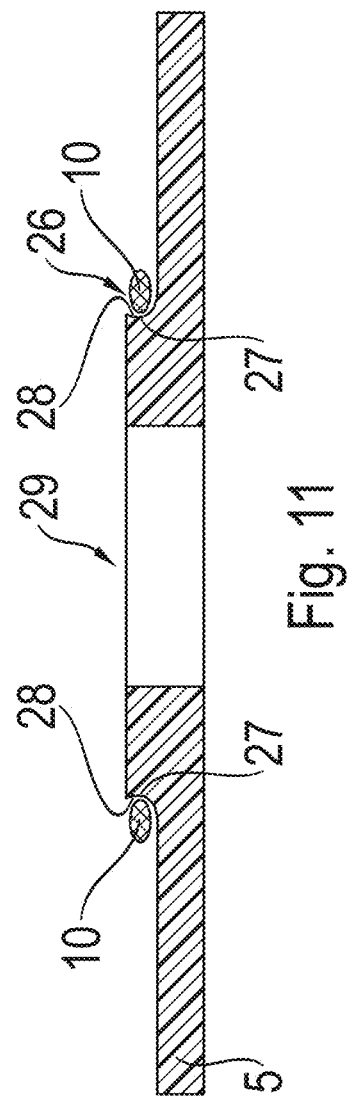

MULTI-POINT LINK FOR AN UNDERCARRIAGE OF A VEHICLE

CROSS REFERENCE TO RELATED APPLICATIONS

This is a U.S. national stage of Application No. PCT/EP2020/060025 filed Apr. 8, 2020. Priority is claimed on German Application No. DE 10 2019 206 436.1 filed May 6, 2019 the content of which is incorporated herein by reference.

BACKGROUND OF THE INVENTION

1. Field of the Invention

The disclosure is directed to a multipoint link for an undercarriage of a vehicle. The present disclosure is further directed to a method for producing a multipoint link for an undercarriage of a vehicle.

2. Description of Related Art

Multipoint links, for example, a four-point link, are used in utility vehicles to guide a rigid axle resiliently in a vehicle frame. A multipoint link constructed as a four-point link takes on the functions of transverse guidance and longitudinal guidance of the rigid axle. Beyond this, a multipoint link of this kind performs the function of a stabilizer and, therefore, during roll motions of a vehicle body that occur, e.g., during cornering, is exposed to additional roll loads.

A multipoint link constructed as a three-point link is used in tractor units in the utility vehicle sector to link the axle to the structural frame. Three-point links contribute in large measure to the transverse guidance and longitudinal guidance of the axle. A three-point link guides the axle in an upper link plane and is exposed to high longitudinal loads and transverse loads during driving operation of the utility vehicle.

US 2005/0044984 discloses a multipoint link that comprises a core element formed of metal and at least one roving of bundled continuous filaments wound around the core element. The at least one roving winding around the core element in at least one layer forms an outer layer of the multipoint link. Recesses, which guide the at least one roving to be laid by winding, are incorporated in the surface of the core element. The laying of the roving is carried out along geodesic paths parallel to the longitudinal axis of the core element.

A multipoint link of the type mentioned above is known from DE 10 2016 209 041 A1. The multipoint link comprises a core element made from a foamed material and at least one roving (filament bundle) wound around the core element. The at least one roving winding around the core element in at least one layer forms an outer layer of the multipoint link. The core element is provided mainly to form the inner shape of the multipoint link. The core element itself is not provided for absorbing loads or, if so, only conditionally. Rather, it is provided primarily for laying up or wrapping with the roving. Loads and forces which are introduced into the multipoint link in load introduction areas through a vehicle axle or a wheel carrier are chiefly absorbed by the outer layer of the multipoint link formed from at least one roving. The core element around which the at least one roving is wrapped during a winding process provides the respective component contour of the multipoint link. The core element must absorb the forces exerted on it during the winding process, particularly at the start, by the at least one roving which is kept under tension. The core element may deform only very slightly because the core element imparts shape, and substantial geometric dimensions (kinematic points) of the multipoint link must be set within close tolerances. The placement of an at least one roving during the winding process essentially follows a geodesic line in order to prevent the roving from slipping off. A geodesic line represents the shortest line between two points on a curved surface. The roving can be laid on the line without the aid of adhesive effects.

Because of the component structure of multipoint links, the possibilities for laying the roving are limited by the risk of slippage or possibly lifting off from the surface of the core element. In addition, laying the roving along the geodesic lines leads to higher expenditure on material. The main load paths of the multipoint link are not covered directly by a continuous geodesic line but rather are only representable circuitously along a plurality of geodesic lines through the layup of the roving.

SUMMARY OF THE INVENTION

Proceeding from the prior art described above, it is an object of one aspect of the present invention to further develop a multipoint link for an undercarriage of a vehicle, particularly a passenger car or a utility vehicle of the kind mentioned in the introductory part that enables a more flexible placement of a roving on a core element for forming the outer, load-absorbing layer of the multipoint link.

According to one aspect of the invention, a multipoint link for an undercarriage of a vehicle is disclosed. The multipoint link comprises a core element formed from a foamed material and at least one roving of bundled continuous filaments wound around the core element. The at least one roving winding around the core element in at least one layer forms an outer layer of the multipoint link serving to absorb loads. According to one aspect of the invention, recesses serving to guide the at least one roving to be laid by winding are incorporated in the surface of the core element. The incorporation of recesses in the surface of the core element makes it possible to show winding patterns independent from the geodesic lines during the winding of the at least one roving. When using rovings that are preimpregnated with resin (towpreg), an appreciable increase in the number of depositions of the at least one roving can be achieved. In particular, geometric structures of the core element, for example, a bulging portion of the core element, can be wrapped by incorporating at least one recess having a highly curved shape without detouring over a plurality of geodesic lines. Accordingly, denser load paths and a more efficient load transfer can be realized. By incorporating recesses, the at least one roving can be selectively laid in order to assist a load transfer of locally multi-axial stress states in the multipoint link. Further, transition points in the course of laying down the at least one roving can be shown, and kinks can be prevented. In particular, material accumulation points can be prevented in the layer formed by winding. A selective strengthening of the layers subsequently laid down by winding with the at least one roving can be achieved by the predeterminable winding structure on the surface.

The recesses can preferably be formed during the production of the core element. This facilitates high-volume manufacture of the core element for a multipoint link, which is significant when using the multipoint link according to one aspect of the invention in the field of passenger cars.

Alternatively, the recesses can be formed by a cutting surface treatment after production of the core element.

In particular, the recesses can have an arcuate cross section and/or a polygonal cross section. The lateral walls which are formed to this end and which delimit the contour of the recesses can bring about a lateral guiding of the roving which is laid under tension in the extending portions of the recesses which follow a defined contour. A combination of different cross-sectional shapes within the extension of a recess can be useful, for example, in the transition points or highly curved transition zones, in that the recess has a polygonal cross section in the latter, while the recess has a substantially arcuate cross section before and after the transition point or highly curved transition zone.

In order to improve the laying of the at least one roving during winding by a robot in the recesses in the surface of the core element, the walls laterally delimiting the recesses have undercuts. In this way, the roving, which is kept under tension, can be held better during winding, i.e., the roving can be prevented from slipping out of the recess unintentionally.

The recesses can preferably be arranged on the surface of the core element to follow a framework-like structure. In so doing, the at least one roving laid on the surface of the core element can function as a framework-like inlay and stiffener of the supporting structure which forms as layer. A very free and selective stiffening of the structure, for example, for determined, particularly local, load cases is made possible by laying the at least one roving into the recesses independent from the free geodesic lines. A selective strengthening of lightweight winding cores is achieved by the framework-like structure for receiving the high winding forces when there are slight deformations concurrently. A dimensional stability of the contour of the core element is achieved in this way.

It is advantageous that the recesses can be arranged to follow main load paths of the multipoint link. Accordingly, the at least one roving, for example, can be laid on the core element of a four-point link along the main load paths running between diagonally opposed supporting arms.

The recesses can preferably be arranged completely independent from free geodesic paths on the surface of the core element.

In particular, the recesses can have straight and/or curved extending portions. Accordingly, the extending portions of the recesses can be flexibly adapted to the desired winding structure to be achieved. Without the recesses, geodesic lines would determine the course of the roving to be laid during winding.

Further, a plurality of recesses can be arranged to run parallel adjacent to one another. It can be useful to fan out the roving over a broader area in order to provide a two-dimensional laying structure for subsequent windings. In particular, a wavy structure can be provided on the surface of the core element by the parallel arrangement of the recesses next to one another.

Further, recesses can be arranged to intersect on the surface of the core element. This is advantageous for forming framework-like structures of the rovings laid on the surface.

Intersecting recesses can have different depths. The depth of a recess is defined as the distance between the surface of the core element and the lowest point of the recess. Rovings can cross from different directions in many areas on the surface of the core element, particularly at nodes of the framework-like structure which serves to reinforce the load-bearing capacity of the core element. It is advantageous that the intersecting recesses have different depths, since an excessive material accumulation due to the roving or rovings wound one over the other can be countered in this way.

Structure elements jutting out over the surface of the core element in portions and having at least one recess extending substantially perpendicular to the surface of the core element can preferably be provided at the core element. In this way, local winding structures, for example, annular winding structures which are required for cutouts or local load introduction points on the multipoint link, can be achieved by a robot.

According to a preferred further development, the core element can be constructed as a hollow body that comprises at least two shell elements. The construction of the core element as a hollow body comprising at least two parts has the advantage of a smaller mass compared to a solid core as core element. The at least two shell elements can preferably have an internal supporting structure. The multiple-part core element can be additionally stiffened by the internal supporting structure.

By providing the internal supporting structure, the core element can be constructed with thinner walls so that a further reduction in mass can be achieved. The internal supporting structure can be formed, for example, by point-shaped or line-shaped spacer elements or ribs. The spacer elements or ribs preferably extend substantially perpendicular to the inner surface of the respective shell element. Accordingly, the spacer elements or ribs can be arranged opposite one another in the joined position of the shell elements forming the core element.

It is further advantageous when the at least two shell elements are connected by positive engagement and/or frictional engagement by the supporting structure. To this end, the supporting structure can be constructed in the form of complementary connection elements that engage in one another at least in positive engagement when the at least two shell elements are joined together. Additionally, the complementary connection elements can be constructed with undercuts. The undercuts can be formed in a mushroom-shaped manner or as a stop. In this way, a kind of snap-in connection can be realized between the at least two shell elements. The production of the shell elements with undercuts at the connection elements is made possible when the foamed material used for production permits a nondestructive forced demolding from the die.

Further, the internal supporting structure can be formed as a material accumulation extending in at least portions over a two-dimensional plane of the respective shell element. The position and arrangement of the material accumulation can be provided, for example, at least partially by winding paths of the at least one roving. An at least partial orientation of the run of the material accumulation to load paths along which loads are absorbed and transferred by the multipoint link is likewise advantageous. It will be appreciated that a material accumulation can be provided in combination with a supporting structure comprising point-shaped or line-shaped spacer elements or ribs.

According to one aspect of the invention, a method for producing a multipoint link for an undercarriage of a vehicle is suggested. The method is characterized by the following: producing a core element from a foamed material; incorporating recesses in the surface of the core element, the recesses being incorporated during or after the production of the core element; and winding around the core element with at least one roving of bundled continuous filaments, which is laid in the recesses.

Incorporating recesses in the surface of the core element, which are not bound to geodesic lines, has the advantage that virtually any winding structure can be generated by the at least one roving. By incorporating recesses, the at least one roving can be selectively laid in order to assist a load transfer of locally multi-axial stress states in the multipoint link. Further, transition points in the laying path of the at least one roving can be shown, and kinks are prevented. In particular, material accumulation points in the layer formed by winding can be prevented.

BRIEF DESCRIPTION OF THE DRAWINGS

Advantageous embodiment forms of the invention which will be described in the following are shown in the drawings. The drawings show:

FIG. 6 is a schematic view of a recess for laying a supporting structure formed as at least one separate roving on the outer side of the core element;

FIG. 7 is a schematic view of a recess;

FIG. 10 is a schematic view of a structure element jutting out in portions locally over the surface of the core element; and FIG. 11 is a sectional view of the structural element along line A-A according to FIG. 10.

DETAILED DESCRIPTION OF THE PRESENTLY PREFERRED EMBODIMENTS

Figure 1C:
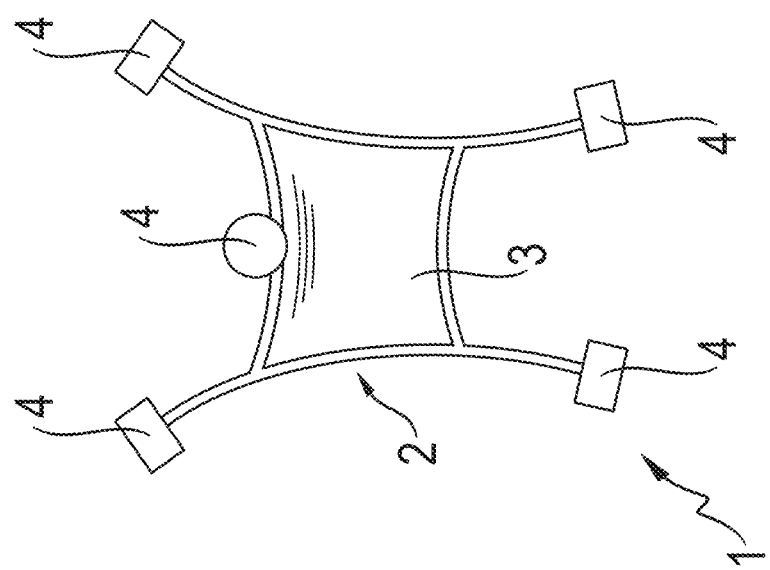
FIGS. 1A to 1C are views of multipoint links for an undercarriage of a vehicle.
Figure 1B:
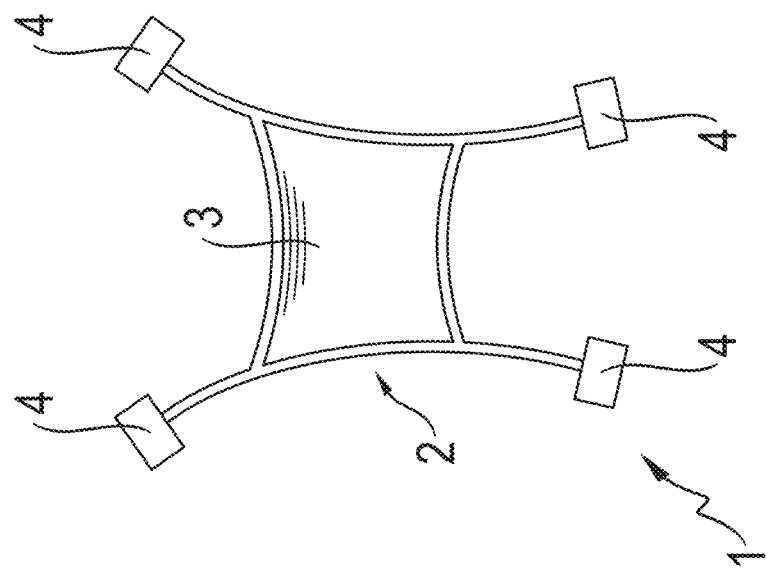
Figure 1A:
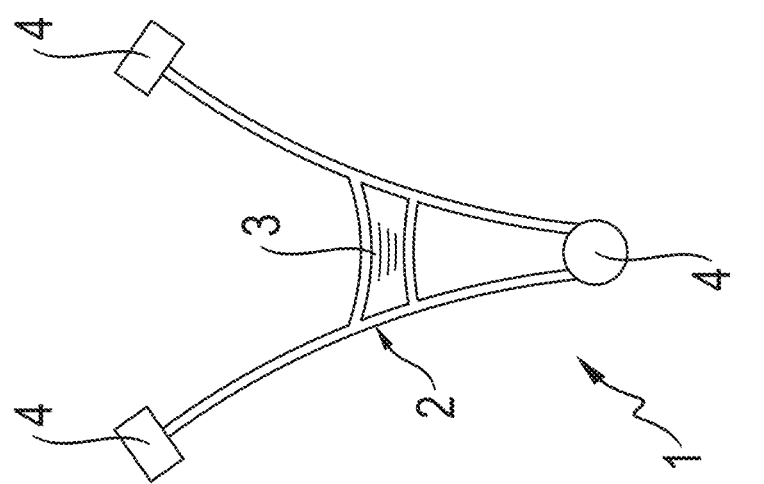

FIGS. 1a to 1c show schematic views of different multipoint links 1 for an undercarriage of a vehicle, not shown. FIG. 1a shows a multipoint link 1 constructed as a three-point link. The multipoint link 1 comprises a body 2 having a plurality of force introduction areas 4 connected to one another by a connection structure 3. The body 2 substantially determines the basic shape of the multipoint link 1. A multipoint link 1 constructed, for example, as a four-point link or as a five-point link is shown in FIGS. 1b and 1c. Multipoint links 1 can connect kinematic points in an undercarriage and/or in a wheel suspension and transmit movements and/or forces. The connection of the multipoint link 1 to further component parts of the undercarriage can be realized by joints arranged in the force introduction areas 4.

Figure 2:
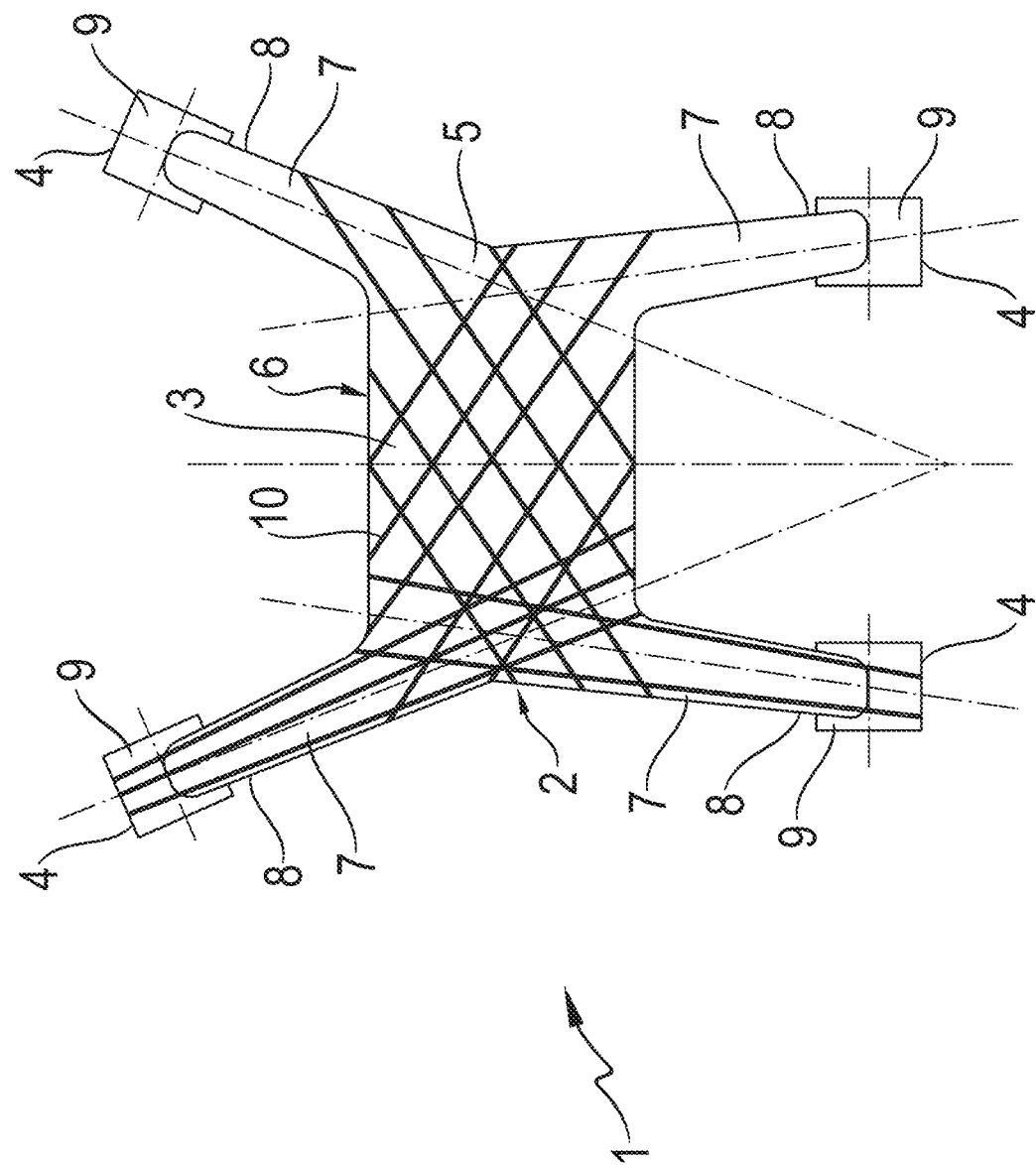
FIG. 2 is a schematic top view of a multipoint link constructed as four-point link.

FIG. 2 schematically shows a top view of a multipoint link 1 constructed as a four-point link. The multipoint link 1 according to one aspect of the invention comprises a core element 5 formed from a foamed material and at least one roving 10 of bundled continuous filaments wound around the core element 5. The at least one roving 10 winding around the core element 5 in at least one layer forms an outer layer of the multipoint link 1. The core element 5 has a torsion element 6 and four supporting arms 7 connected integral with the torsion element 6. Portions 8 for receiving load introduction elements are arranged at the distal ends of the supporting arms 7. To this end, a bushing 9 for receiving a respective load introduction element—not shown—constructed as a ball-and-socket joint or elastomer bearing is arranged at the respective portion 8. The multipoint link 1 constructed as a four-point link is used, for example, in a utility vehicle as an undercarriage link and takes over the tasks of a three-point link and a stabilizer. Accordingly, the multipoint link 1 constructed as a four-point link takes on the task of transverse guidance and longitudinal guidance of a rigid axle and roll stabilization.

Figure 3:
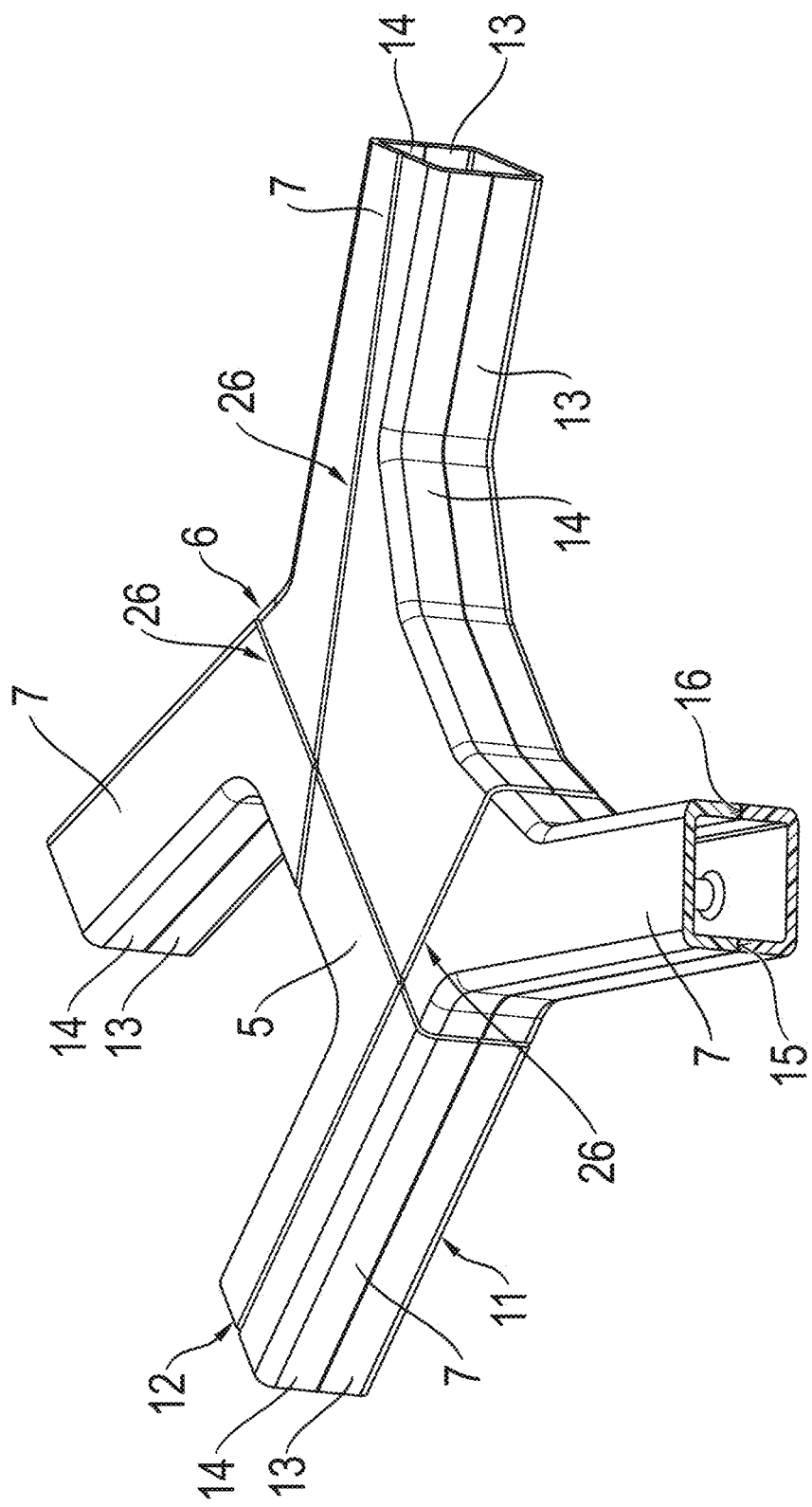
FIG. 3 is a schematic perspective partial view of a core element of the multipoint link according to FIG. 2.
Figure 5:
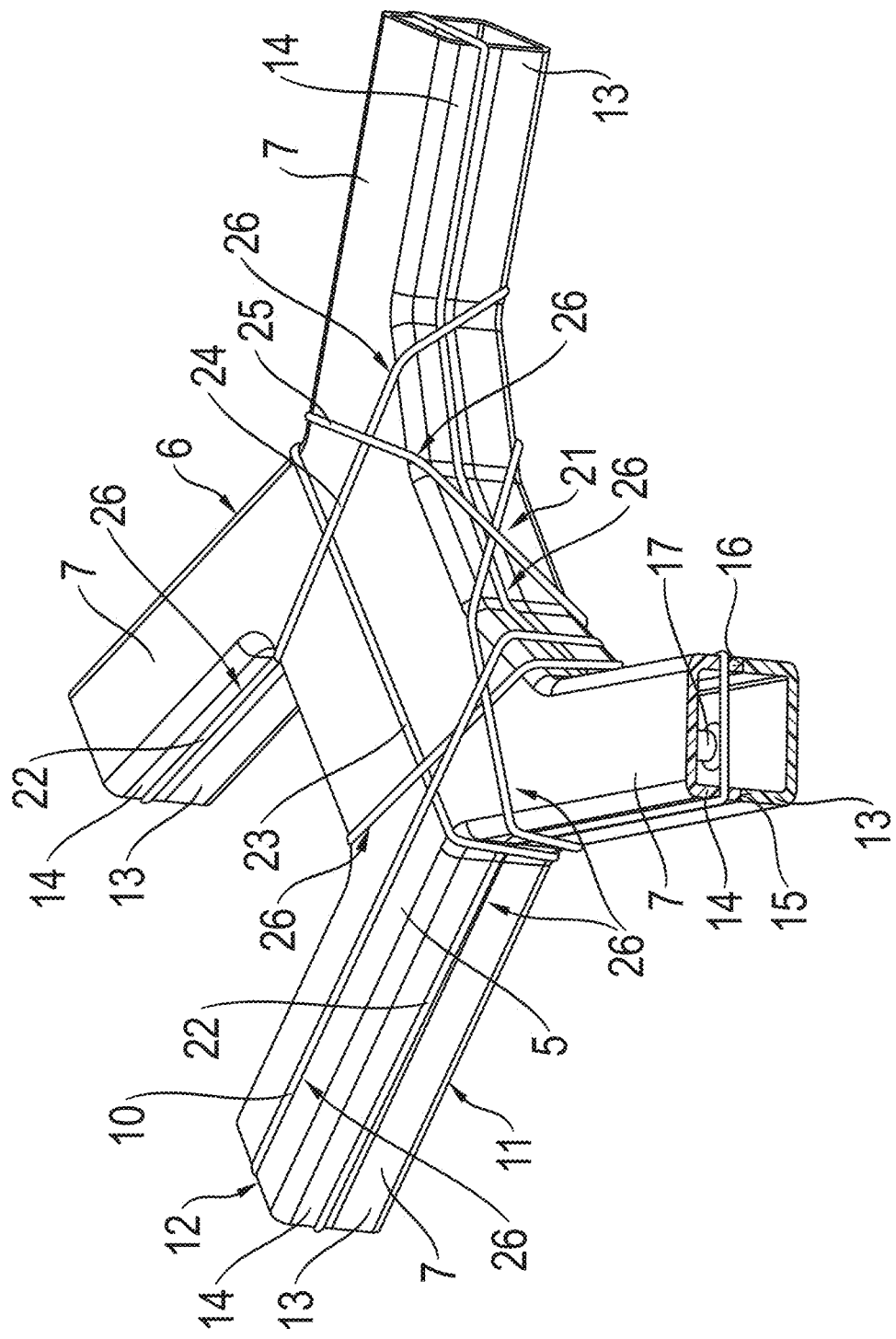
FIG. 5 is a schematic perspective partial view of a core element with an external supporting structure.

FIG. 3 schematically shows a perspective partial view of only the core element 5 according to FIG. 2. According to one aspect of the invention, the core element 5 is constructed as a hollow body that comprises at least two shell elements 11, 12 that are joined together. In the depicted embodiment example, the lower shell element 11 and the upper shell element 12 are formed as half-shells. The at least two shell elements 11, 12 are preferably symmetrically constructed. The shell elements 11, 12 constructed as half-shells have a substantially U-shaped profile cross section. The shell elements 11, 12, which are joined together to form the core element 5, have walls 13, 14 which are substantially perpendicular to one another. The walls 13, 14 delimit the outer contour of the respective shell elements 11, 12. End faces at the walls 13, 14 form abutment surfaces 15, 16 that extend transverse to walls 13, 14 and on which the shell elements 11, 12 sit one upon the other after being joined. An adhesive can be applied to one or both abutment surfaces 15, 16 prior to joining for a nondetachable connection so that a material bond of the at least two shell elements 11, 12 is achieved. The material bond also makes it possible to construct the core element 5 to be tight against fluid. Recesses 26 are arranged on the surface of the core element 5 as is indicated in a schematic and merely exemplary manner in FIG. 3. These recesses 26 are used for laying and guiding the at least one roving 10. In particular, a plurality of separate rovings 22, 23, 24, 25 can be laid in the recesses 26 as is shown in FIG. 5. These separate rovings 22, 23, 24, 25 can form a supporting structure 21 on which the at least one roving 10 is laid by winding around it.

Figure 4:
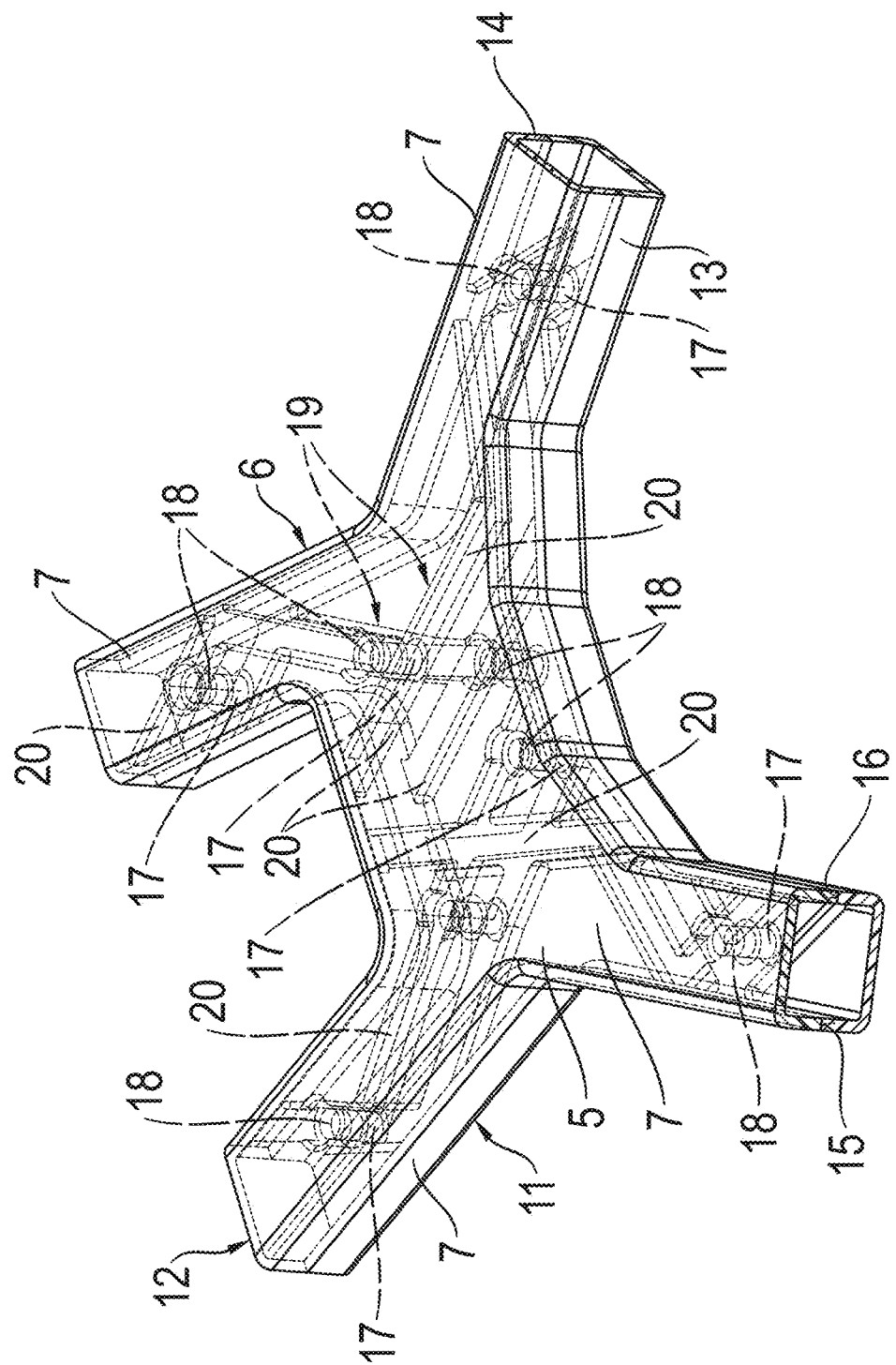
FIG. 4 is a schematic view of the core element according to FIG. 3 with a shell element shown transparently.

FIG. 4 schematically shows the core element 5 according to FIG. 3 with an upper shell element 12 shown transparently. Connection elements 17, 18 that are arranged opposite one another in the interior of the two shell elements 11, 12 and are constructed in particular to complement one another are visible through the transparent depiction of the upper shell element 12. The connection elements 17 of the lower shell element 11 can be constructed as cylindrical pins, and the connection elements 18 of the upper shell element 12 can be constructed as hollow-cylindrical portions in which the connection elements 17 constructed as cylindrical pins can be inserted. The at least two shell elements 11, 12 are connected with one another by positive engagement and/or frictional engagement by the complementary connection elements 17, 18. Further, the at least two shell elements 11, 12 can be fixed with respect to their position by the connection elements 17, 18 when joined.

Further, the connection elements 17, 18 function as a supporting structure 19 in the interior of the core element 5. Accordingly, the core element 5 is stiffened, which increases the loadability of the core element 5 particularly at the start of the winding process.

Alternatively, the supporting structure 19 in the interior of the respective shell element 11, 12 can be constructed as ribs or as point-shaped and/or line-shaped spacer elements. In the joined state of the shell elements 11, 12, the ribs or point-shaped and/or line-shaped spacer elements sit one on top of the other so that the compressive forces which are absorbed when the at least one roving 10 is wound around the core element 5 and which result from the filament tension of the roving 10 do not lead to an unwanted deformation of the core element 5.

This embodiment form has, in addition, a supporting structure 19 formed as a material accumulation 20, particularly a structured material accumulation 20, extending in portions over an internal two-dimensional plane of the respective shell element 11, 12. The shape of the material accumulation 20 on the respective inner side of the shell elements 11, 12 can preferably correspond to a framework-like structure as is indicated in FIG. 4.

FIG. 5 schematically shows a perspective partial view of the core element 5 with an external supporting structure 21. The external supporting structure 21 comprises at least one separate roving 22, 23, 24, 25 wound around the core element 5. A plurality of separate rovings 22, 23, 24, 25 are preferably provided in order to join and connect the at least two shell elements 11, 12 to one another to form the core element 5. Therefore, undercuts at the abutment surfaces 15, 16 or gluing the at least two shell elements 11, 12 to one another can be dispensed with. Further, an additional stabilization of the core element 5 is achieved by the separate rovings 22, 23, 24, 25 so that this core element 5 can absorb higher loads during the subsequent winding process.

It is provided to arrange recesses 26 in the surface on the outer side of the at least two shell elements 11, 12 as has already been shown schematically in FIG. 3. These recesses 26, which are channel-shaped in particular, can be incorporated in the shell elements 11, 12 already during the production process for the latter. Alternatively, the recesses 26 can be incorporated by a subsequent machining of the surface of the shell elements 11, 12 or of the core element 5 after it has already been assembled.

The arrangement of the recesses 26 is preferably carried out independent from geodesic paths so that winding structures can be freely defined. Accordingly, the separate rovings 22, 23, 24, 25 can be freely laid on the surface of the shell elements 11, 12 in order to selectively generate a shape of the supporting structure 21, which at least partially enables a laying of the separate rovings 22, 23, 24, 25 independent from the external shape of the core element 5. In this respect, the shapes of the separate rovings 24 and 25 are referred to. The laying of the rovings 24 and 25 serves to fix and tighten roving 22 in the recess 26 provided therefor, this roving 22 surrounding the core element 5 in circumferential direction along the narrow perpendicularly extending wall 14. The separate rovings 22, 23, 24, 25 can likewise be produced by a robot and preferably form a framework-like structure.

In a further aspect, the separate rovings 22, 23, 24, 25 that run around the at least two shell elements 11, 12 and by which the at least two shell elements 11, 12 are joined are connected to the roving 10 wound around the core element 5 to form an outer layer. Accordingly, a strengthening of the supporting structure of the core element 5 is achieved. In so doing, the separate rovings 22, 23, 24, 25 on the surface of the core element function as a framework-like inlay and stiffening of the supporting structure. Since the separate rovings 22, 23, 24, 25 need not be laid on free geodesic paths but rather are located in the recesses 26, a very free and selective strengthening of the supporting structure is possible, for example, for determined load cases.

FIG. 6 shows a schematic view of a recess 26 for laying a supporting structure 21 constructed as at least one separate roving 23 on the outer side of the core element 5 and the recess 26 with a roving 23 laid therein. The recess 26 constructed as guide channel is formed with an arcuate cross section in which the separate roving 23 or roving 10 is laid. According to a further development shown in FIG. 7, the recesses 26 can have undercuts 28 at the wall portions 27 delimiting the recess 26 in order to improve the guiding and holding of the separate rovings 22, 23, 24, 25 in the respective recess 26. Accordingly, a better lateral fixing of the separate rovings 22, 23, 24, 25 laid in the recesses 26 is achieved in particular. The recesses 26 arranged on the surface can have different cross-sectional shapes. Accordingly, the recesses 26 can be formed at least partially with a polygonal cross section.

Figure 8:
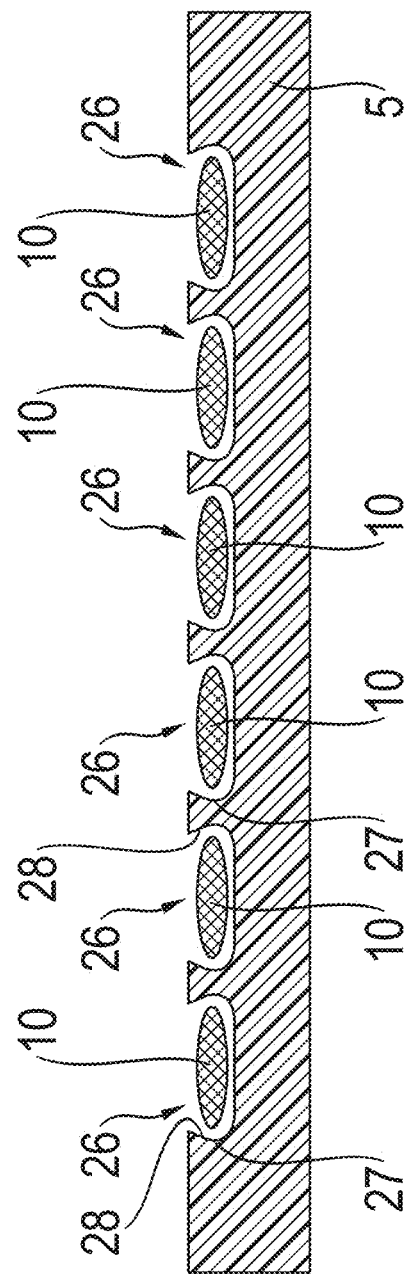
FIG. 8 is a schematic view of a plurality of recesses extending parallel to one another.

The view in FIG. 8 schematically shows a plurality of recesses 26 in the surface of the core element 5 which run parallel to one another. The at least one roving 10 can fan out over a broad area in a two-dimensional manner by this arrangement.

Figure 9:
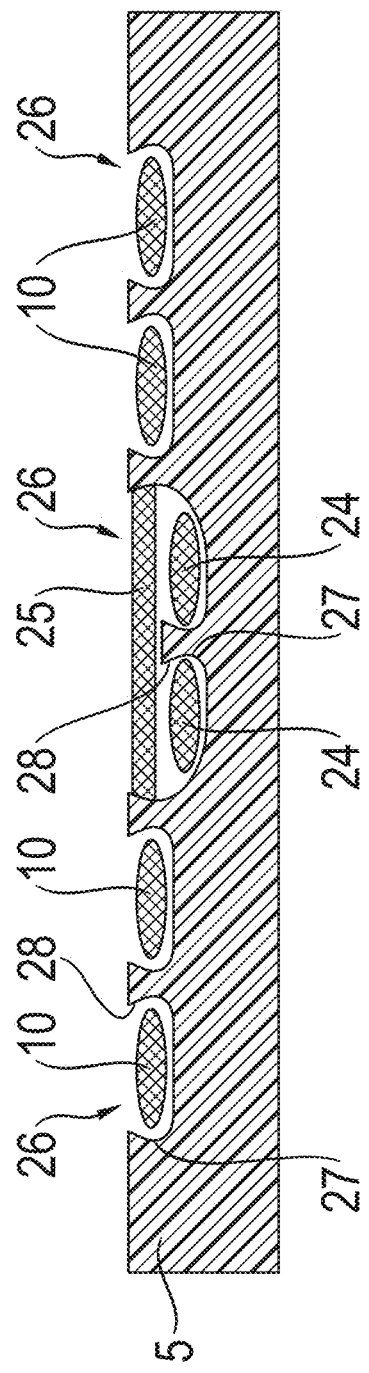
FIG. 9 is a schematic view of intersecting recesses.

FIG. 9 shows a schematic view of intersecting recesses 26. Intersecting recesses 26 have different depths. The depth of a recess 26 is defined as the distance between the surface of the core element 5 and the lowest point of the recess 26. In many areas on the surface of the core element 5, an overlapping intersection of rovings 10, 22, 23, 24, 25 can come about from different directions, particularly at nodes of the framework-like structure which serves to reinforce the load carrying capacity of the core element 5. It is advantageous that the intersecting recesses 26 have different depths, since an excessive material accumulation due to the roving or rovings 10, 22, 23, 24, 25 wound one over the other can be countered in this way in that laying is effected on different planes.

FIG. 10 shows a schematic view of a structure element 29 which juts out in portions locally over the surface of the core element 5. The structure element 29 that juts out in portions over the surface is constructed with at least one recess 26 extending substantially perpendicular to the surface. A transition point in the winding with the at least one roving 10 can be shown by the structure element 29. This recess 26 arranged so as to run perpendicular to the surface of the core element 5 can be applied for generating local winding structures, for example, annular winding structures, by the robot as is required, inter alia, for cutouts or local load introduction points.

FIG. 11 shows a sectional view of the structure element 29 along line A-A according to FIG. 10. The roving 10 can be wound at least in portions around the structure element 29, for example, as a local transition point, or completely and repeatedly to form a local winding structure.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A multipoint link for an undercarriage of a vehicle, comprising:
   a core element formed from a foamed material;
   at least one roving of bundled continuous filaments wound around the core element,
   wherein the at least one roving winding around the core element in at least one layer forms an outer layer of the multipoint link; and
   recesses configured to guide the at least one roving to be laid by winding are incorporated in a surface of the core element, wherein walls that laterally delimit the recesses have undercuts,
   wherein the recesses are arranged independent from free geodesic paths on the surface of the core element.

2. The multipoint link according to claim 1, wherein the recesses are formed during production of the core element.

3. The multipoint link according to claim 1, wherein the recesses are formed by a cutting surface treatment after production of the core element.

4. The multipoint link according to claim 1, wherein the recesses have at least one of an arcuate cross section and a polygonal cross section.

5. The multipoint link according to claim 1, wherein the recesses are arranged on the surface of the core element to follow a framework-like structure.

6. The multipoint link according to claim 1, wherein the recesses are arranged to follow main load paths of the multipoint link.

7. The multipoint link according to claim 1, wherein the recesses have straight and/or curved extending portions.

8. The multipoint link according to claim 1, wherein a plurality of recesses are arranged parallel adjacent to one another.

9. The multipoint link according to claim 1, wherein the recesses are arranged to intersect on the surface of the core element.

10. The multipoint link according to claim 1, further comprising:
    structure elements formed at the core element jutting out in portions over the surface of the core element and having at least one recess extending substantially perpendicular to the surface of the core element.

11. The multipoint link according to claim 1, wherein the core element is constructed as a hollow body which comprises at least two shell elements.

12. A multipoint link for an undercarriage of a vehicle, comprising:
    a core element formed from a foamed material;
    at least one roving of bundled continuous filaments wound around the core element,
    wherein the at least one roving winding around the core element in at least one layer forms an outer layer of the multipoint link; and
    recesses configured to guide the at least one roving to be laid by winding are incorporated in a surface of the core element, wherein walls that laterally delimit the recesses have undercuts,
    wherein the recesses have at least one of an arcuate cross section and a polygonal cross section,
    wherein a combination of different cross-sectional shapes within an extension of a respective recess are provided in one or more transition points or highly curved transition zones in that the recess has a polygonal cross section in the latter, while the recess has a substantially arcuate cross section before and after the one or more transition points or highly curved transition zones.

13. The multipoint link according to claim 9
    A multipoint link for an undercarriage of a vehicle, comprising:
    a core element formed from a foamed material;
    at least one roving of bundled continuous filaments wound around the core element,
    wherein the at least one roving winding around the core element in at least one layer forms an outer layer of the multipoint link; and
    recesses configured to guide the at least one roving to be laid by winding are incorporated in a surface of the core element, wherein walls that laterally delimit the recesses have undercuts,
    wherein the recesses are arranged to intersect on the surface of the core element, and
    wherein the intersecting recesses have different depths.

14. A method for producing a multipoint link, comprising:
    producing a core element from a foamed material;
    incorporating recesses in a surface of the core element, wherein the recesses are incorporated during or after production of the core element, wherein walls laterally delimit the recesses have undercuts; and
    winding, around the core element, at least one roving of bundled continuous filaments which is laid in the recesses,
    wherein the recesses are arranged to intersect on the surface of the core element, and
    wherein the intersecting recesses have different depths.

* * * * *